Patented Feb. 17, 1942

2,273,305

UNITED STATES PATENT OFFICE 2,273,305

PRODUCTION OF COLOR EFFECTS ON TEXTILE OR OTHER MATERIALS

William Whitehead, Rye, N. Y., assignor to Celanese Corporation of America, a corporation of Delaware No Drawing. Application April 1, 1939, Serial No. 265,508

2 Claims. (Cl. 8—14)

This invention relates to the treatment of textile or other materials whereby novel color effects are produced thereon.

It is an object of my invention to provide a process for producing diffused colorations on textile or other materials made of or containing organic derivatives of cellulose, by treating the materials before or after the application of a coloring composition thereto with vapors which have at least some solvent action on the dyestuff employed. Other objects of my invention will appear from the following detailed description and the claims.

I have found that if textile or other materials made of or containing organic derivatives of cellulose are treated, either before or after applying a coloring composition thereto, with vapors of certain compounds having a solvent action on the dyestuff in said composition, or with vapors of non-solvent compounds capable of reacting with an ingredient of said composition to form bodies which are solvents for the dyestuff, the dyestuff is caused to flow or bleed over the surface of the textile or other materials. After the vapor treatment the materials are dried.

The process of my invention produces diffused color effects which are very pleasing to the eye. Moreover, the various steps of the process may be effected as a continuous operation. For example, the material may be passed first through a suitable device for applying the dyestuff thereto, thence through the vapor of the organic solvent and finally through a suitable continuous dryer. The vapor treatment may be effected in a substantially closed chamber into which the vapors of the organic solvent may be introduced from an external source, or the liquid organic solvent may be introduced and vaporized in the chamber. The chamber may be maintained at any desired temperature.

The application of the dyestuff to the materials may be carried out in any suitable manner. Preferably, however, the dyestuff is applied to the materials in the form of a printing paste. Where yarns are treated, the dyestuff may be applied thereto while the yarns are in the form of hanks or skeins, or while the yarns are being subjected to a winding, twisting or other textile operation.

The volatile organic solvent employed depends upon the nature of the material to be colored and the nature of the dyestuff to be used. The organic solvent must, of course, be a sufficiently good solvent for the dyestuff. To obtain more accentuated diffused color effects the organic solvent should also have some swelling action on the material to be colored, at least at the temperature at which the vapor treatment is effected.

Examples of volatile solvents which have been found useful for the coloration of cellulose acetate materials in accordance with this invention, since they are good solvents for many of the water-insoluble dyestuffs which are used for coloring cellulose acetate materials, are aromatic hydrocarbons such as benzene, xylene, toluene, etc., chlorinated compounds such as chloroform, dichlorethylene, trichlorethylene and ethylene dichloride, etc., monohydric alcohols such as methyl alcohol, ethyl alcohol, propionyl alcohol, butyl alcohol, amyl alcohol, etc. and polyhydric alcohols such as the glycols and their derivatives. Obviously, mixtures of two or more of these volatile solvents may be employed as, for example, a mixture of ethylene dichloride and benzene. Likewise, the severity of the solvent action of one vapor may be modified by the presence of a vapor of lower solvent value, or alternatively a non-solvent, such as gasoline, may be applied to the material before exposure thereof to the solvent vapor. The dyestuff used may be any dye that has an affinity for the cellulose acetate and that is soluble in the organic solvent or solvent mixture employed, for example, the water-insoluble dyes of the nitrodiarylamine, azo, amino anthraquinone or other series which have been solubilized with the aid of a sulphoricinoleic acid or other dispersing agent. Examples of such dyes are 2.4-dinitro-diphenyl-amine—(yellow), dimethyl-amino-anthraquinone—(blue). The concentration of the solvent vapor should be small enough so as not appreciably to dissolve the cellulose acetate of the materials.

Substances other than organic solvents per se may be employed in my process. Thus I may use volatile compounds which are not solvents for the dyestuff but which react with an ingredient of the coloring composition to form a solvent for the dyestuff. For example, I may treat materials with vapors of ethylene oxide, which vapors react with the moisture in the printing paste applied to the materials to form ethylene glycol. Homologues of ethylene oxide may also be used.

While this invention is of particular value in connection with the production of colorations on materials made of or containing cellulose acetate, my process may also be used in the coloration of other synthetic materials such as polyvinyl or other synthetic resins, linear condensation polymers such as polyamides derived from amino acids or derived by the condensation of diamines with dicarboxylic acids, e. g. polyhexamethylene adipamide, other cellulose esters such as cellulose formate, cellulose propionate and cellulose butyrate, or cellulose ethers such as methyl cellulose, ethyl cellulose and benzyl cellulose. Mixed esters such as cellulose nitro-acetate, cellulose aceto-propionate and cellulose aceto-butyrate may also be used.

Where yarns or fabrics are treated in accordance with the process of this invention they may consist wholly of a single synthetic material, or of a mixture of synthetic materials, or of a mixture of synthetic materials with fibers of natural materials such as natural silk, wool, cotton, etc.

In one method of carrying out my invention, a printing paste containing a suitable dyestuff is applied locally to a fabric comprising yarns of cellulose acetate. After the local application of the printing paste, the material is treated with the vapors of the organic solvent. The solvent vapor effects a swelling action on the cellulose acetate and dissolves the dyestuff causing the dyestuff to flow or bleed onto the portions of the fabric not treated with the printing paste. The dyestuff diffuses over the surface of the fabric with gradations of color depth producing pleasing color effects. Particularly desirable diffused color effects are produced where the printing paste contains different dyestuffs each of which is soluble to a different extent in the solvent vapor employed. In this case, the dyestuffs flow or bleed to different extents, thus producing novel and pleasing chromatic effects.

The proportions of the ingredients and the number of dyestuffs used in the printing paste may be figured within wide limits, depending upon the effect desired.

After the application of the dyestuff to the yarns or fabric and the treatment with the vapor of the organic compound, the yarns or fabric may if desired be scoured, which scouring may be done in any suitable manner.

The following examples serve to illustrate convenient forms of execution of my invention, it being understood however that they are in no way limitative.

Example I

A satin fabric made wholly of yarns of cellulose acetate has the following printing paste applied locally over the surface thereof so that the individual applications of the printing paste are about one-eighth of an inch apart.

|  | Parts by weight |
|---|---|
| Gum tragacanth | 40 |
| Water | 2000 |
| Dimethyl amino anthraquinone | 4 |

The fabric is then treated with the vapors of ethylene dichloride dissolving the dimethyl amino anthraquinone so that it bleeds on to the unprinted portions of the fabric. The fabric is then scoured for 10 to 30 minutes in an aqueous bath containing from 0.5 to 0.75 gram of soap per liter and about 0.25 gram of sodium hydrosulphite per liter at a temperature of 45 to 50° C. The fabric is then dried. The fabric so treated has diffused color effects of various shades of blue over the surface thereof.

Example II

A satin fabric made wholly of yarns of cellulose acetate has the following printing paste applied locally over the surface thereof so that the individual applications of the printing paste are about one-eighth of an inch apart.

|  | Parts by weight |
|---|---|
| Gum tragacanth | 40 |
| Water | 2000 |
| Dimethyl amino anthraquinone | 4 |
| 2,4-dinitro-diphenyl-amine | 4 |

The fabric is then treated with the vapors of ethylene dichloride dissolving the dyestuffs to different extents so that they bleed on to the unprinted portions of the fabric. The fabric is then scoured for 10 to 30 minutes in an aqueous bath containing from 0.5 to 0.75 gram of soap per liter and about 0.25 gram of sodium hydrosulphite per liter at a temperature of 45 to 50° C. The fabric is then dried. The fabric so treated has diffused color effects of various shades of blue, yellow and green overlapping each other over the surface of the fabric.

It is to be understood that the foregoing detailed description is given merely by way of illustration and that many variations may be made therein without departing from the spirit of my invention.

Having described my invention, what I desire to secure by Letters Patent is:

1. Process for producing color effects on materials containing organic derivatives of cellulose, which comprises locally applying to the surface of said materials a coloring composition containing a plurality of water-insoluble dyestuffs having different solubility characteristics in organic solvents and then subjecting said materials to the action of a vapor of ethylene dichloride so as to cause said organic derivatives of cellulose to swell and said dyestuffs to dissolve to different extents and to bleed on to the uncolored portions of said materials, whereby diffused color effects are produced on the surface of said materials.

2. Process for producing color effects on materials containing cellulose acetate, which comprises locally applying to the surface of said materials a coloring composition containing a plurality of water-insoluble dyestuffs having different solubility characteristics in organic solvents and then subjecting said materials to the action of a vapor of ethylene dichloride so as to cause said cellulose acetate to swell and said dyestuffs to dissolve to different extents and to bleed on to the uncolored portions of said materials, whereby diffused color effects are produced on the surface of said materials.

WILLIAM WHITEHEAD.